United States Patent [19]

Lebo, Jr. et al.

[11] Patent Number: 5,688,999
[45] Date of Patent: Nov. 18, 1997

[54] PRODUCTION OF OXIDIZED HUMIC ACIDS BY AN OXYGEN-ALKALI PROCESS

[75] Inventors: Stuart E. Lebo, Jr., Schofield; Kevin R. Wirtz, Mosinee; Stephen L. Dickman, Wausau, all of Wis.

[73] Assignee: Lignotech USA, Inc., Rothschild, Wis.

[21] Appl. No.: 592,678

[22] Filed: Jan. 26, 1996

[51] Int. Cl.$^6$ ................................................ C07C 65/01
[52] U.S. Cl. ............................................................ 562/475
[58] Field of Search ............................................. 562/475

[56] References Cited

U.S. PATENT DOCUMENTS

| | | | |
|---|---|---|---|
| 4,319,041 | 3/1982 | Goff | 562/475 |
| 4,912,256 | 3/1990 | Cronje | 562/465 |
| 5,004,831 | 4/1991 | Dekker et al. | 562/475 |
| 5,248,814 | 9/1993 | Calemma et al. | 562/475 |

OTHER PUBLICATIONS

Yaghmaie et al, Coal–Water Slurries of Low Viscosity, Chemical Abstracts, vol. 102, 1985, p. 156.

Zhambal, Composition and Structural Features of Sufohumic Acids, 51–Fossil Fuels, vol. 115, 1991, p. 139453.

Sharanova, Determination of the Amount and Form of Sulfur in Sulfonated Humates, 51 Fossil Fuels, vol. 107, 1987, p. 99563.

Olle Otero et al, Sulfited and Sulfonated Derivatives of Humic Acid and the Like, 19–Fert. Soils, Plant Nutr., vol. 96, 1982, p. 84643.

Pobedonostseva et al, Nonfuel Coal Processing, Chemical Abstracts, vol. 90, 1979, p. 106702.

Humic Acids, The Merck Index, Eleventh Edition, 1989, p. 4675.

*Primary Examiner*—Paul J. Killos
*Attorney, Agent, or Firm*—Andrus, Sceales, Starke & Sawall

[57] ABSTRACT

A method is disclosed for the production of oxidized humic acids. The process of the invention comprises reacting humic acid bearing ores with oxygen under alkaline conditions at a temperature between 100° C. and 200° C. for at least ½ hour, but usually for 1–2 hours, to produce oxidized humic acids which are soluble at pH as low as 2.9 and which are formed in yields of at least 70%. The oxidized humic acids produced according to the process of the invention are also superior viscosity reducers.

20 Claims, No Drawings

PRODUCTION OF OXIDIZED HUMIC ACIDS BY AN OXYGEN-ALKALI PROCESS

BACKGROUND OF THE INVENTION

This invention relates to the production of oxidized humic acids by alkaline/air oxidation of humic acid bearing ores. Production by the alkaline/air oxidation process described herein gives humic acids which have better solubility in acid systems and which are different from humic acids produced by earlier processes.

One such earlier process for producing humic acids is described in U.S. Pat. No. 4,912,256. It involves mixing coal with an aqueous medium to produce a slurry having a pH in the range of 4–9. The slurry thus produced is reacted with a gaseous oxidant such as air or oxygen under conditions of temperature and pressure for a time sufficient to cause the oxidation of the coal. Separation of the reaction product from the aqueous medium produces an oxidized coal containing humic acids. Under the conditions used in this process, however, the humic acids contained in such coals are only mildly oxidized and are not isolated as a discrete product.

Another oxidative process described in South African Patent No. 87/9232 involves oxidation of coal in the dry state in a fluid bed reactor. Coal with a particle size in the 100 micron to 3 mm range is heated to 150° to 300° C. under a partial pressure of oxygen for a time of 30 to 600 minutes to produce oxidized coals containing humic acids. No alkali is used in this process, however.

Yet another method for producing humic acids from oxidized coals is described in U.S. Pat. No. 5,004,831. The process involves mixing oxidized coal with aqueous alkali, heating the mixture to 100° to 180° C. under sufficient pressure to prevent evaporation of water, and maintaining the elevated temperature for a time sufficient to extract a substantial amount of the available humic acids. Like the other methods described above, however, this method does not use conditions which promote extensive oxidation of the humic acids contained in the coal.

Traditional methods for producing humic acids from humic acid bearing ores involve extraction with alkali. An example of such an extraction process is described in U.S. Pat. No. 4,319,041. It involves mixing humic acid containing ores with water and caustic soda and extraction of the humic acids by agitation at pH 6.5–8.0. The times required in this process are quite lengthy, however, and the humic acids produced are not oxidized.

SUMMARY OF THE INVENTION

The present invention is a simple process for producing oxidized humic acids. The method comprises the steps of (a) dissolving a humic acid containing ore in alkali to form a reaction mixture; (b) reacting the reaction mixture with an oxidant under conditions of temperature and pressure and for a time sufficient to cause the oxidation of the humic acid containing ore to produce an oxidized humic acid concentrate; and (c) separating the oxidized humic acid concentrate from the reaction mixture. Optionally, the reaction mixture may be saturated with oxygen prior to the start of the oxidation reaction.

The process of the invention particularly comprises reacting humic acid bearing ores with oxygen under alkaline conditions at a temperature between 100° C. and 200° C. for at least 0.5 hour, but usually for 1–6 hours, to produce oxidized humic acids which are soluble at pH as low as 2.9 and are formed in yields of at least 70%. Suitable oxygen pressures in the process are 5 to 200 psi and suitable sources of alkali for the process include sodium hydroxide, potassium hydroxide, ammonium hydroxide, lithium hydroxide and/or combinations of these materials. The process, particularly, calls for reacting a humic acid bearing ore such as leonardite with oxygen in the presence of 15 to 30% sodium hydroxide and at 170° C. for 1 hour. Removal of insolubles by filtration, centrifugation or settling gives oxidized humic acids soluble at pH 3.0 or greater at yields of at least 70%. If desired, the oxidized humic acids may be formed into a powder, preferably, by spray drying.

The process described herein produces oxidized humic acids in good yield from humic acid containing ores. One important feature of the invention is that the oxidized humic acids produced in the process have improved solubility in acid solutions. Another advantage is that the oxidized humic acids produced in the process are isolated either as a liquid concentrate or as a dried powder. A third advantage of the process is that it is rapid and easy. A final advantage is that the oxidized humic acids produced by the process are superior viscosity reducing agents when compared to humic acids prepared by earlier methods.

DETAILED DESCRIPTION OF THE PREFERRED EMBODIMENT

According to the invention, a process for producing oxidized humic acid concentrates includes the steps of (a) dissolving a humic acid containing ore in alkali to form a reaction mixture; (b) reacting said reaction mixture with an oxidant under conditions of temperature and pressure and for a time sufficient to cause the oxidation of the humic acid containing ore to produce an oxidized humic acid concentrate; and (c) separating the oxidized humic acid concentrate from the reaction mixture. The liquid concentrate obtained by the process may further be formed into a powder, preferably by spray drying, if desired.

As used in the specification, the term "humic acid containing ore" is defined as including lignites (especially leonardite), brown coals and peats, as well as artificial humic acids such as the products of the oxidative polymerization of quinones. The preferred ore is leonardite due to its ready availability and relatively inexpensive cost. The mean particle size of the ore will normally be less than about 3 mm. Preferably, the mean particle size of the ore varies in the range of 10–1000 microns and most preferably, the mean particle size is in the range of 10–100 microns. Thus, finer particles of ore result in the reaction occurring with relative ease enabling the reaction to be completed in a relatively shorter period of time.

The first step of the process of the invention involves dissolving the humic acid containing ore in alkali. Any alkali may be employed that provides sufficient alkalinity to adjust the pH high enough to dissolve the humic acid containing ore. Preferably, the pH of the reaction mixture is 9–13 with 10–12 being preferred and pH 11 most preferred. Examples of alkali that may be used to dissolve the humic acid containing ore include sodium hydroxide, potassium hydroxide, ammonium hydroxide, lithium hydroxide, sodium carbonate, potassium carbonate, lithium carbonate, and mixtures thereof. Most preferably, sodium hydroxide is used due to its ready availability. It should be noted that calcium hydroxide probably should not be employed since it will form an insoluble component. If the alkali employed is sodium hydroxide, it preferably comprises 10–30% by weight of the reaction mixture. If the alkali employed is potassium hydroxide, it preferably comprises 14–42% by weight of the reaction mixture. If the alkali employed is ammonium hydroxide, it preferably comprises 9–26% by weight of the reaction mixture. If the alkali employed is lithium hydroxide, it preferably comprises 6–18% by weight of said reaction mixture.

The second step of the process involves reacting the reaction mixture under conditions of temperature and pressure and for sufficient time to produce an oxidized humic acid concentrate. The reaction is preferably carried out in a pressurized closed vessel equipped with a suitable distributer or stirring mechanism to insure effective mass and heat transfer between the liquid, solid and gaseous phases contained therein. The closed vessel should be rated at 2–1000 psi, preferably 2–400 psi to prevent evaporation of water. The reaction takes place at a temperature of between about 100° C. to 200° C. Preferably, the reaction temperature ranges between 140° C. to 180° C. and most preferably between 160° C. to 170° C. The mixture is reacted for about 0.5–6 hours with the preferred reaction time being 1–4 hours depending upon the reaction temperature. In any event, the reaction step is continued for a period of time sufficient to produce an oxidized humic acid concentrate in yields of at least about 70%. These oxidized humic acid concentrates are soluble at pH as low as about 2.9.

The oxidant employed in the oxidation step of the present process is preferably a gaseous oxidant which is bubbled through the reaction mixture at a charge of 5–200 psi. The oxidant is selected from oxygen, air and mixtures thereof with the preferred oxidant being oxygen. The oxidation step is carried out for sufficient time and under sufficient pressure and temperature to insure substantially complete oxidation of the humic acid containing ore.

After the reaction is complete, the undissolved solids present in the reaction mixture are separated from the oxidized humic acid concentrate by filtration, settling and/or centrifugation. Upon completion of the process, a liquid product is formed which is a minimum of 5%, preferably a minimum of 16%, oxidized humic acid in aqueous solution. The pH of said product typically is between 7–9, but pH 8.5 is preferred.

EXAMPLE 1

The above features and advantages of the invention are accomplished according to one preferred embodiment by mixing humic acid containing ores such as leonardite with 15% sodium hydroxide until the ore is substantially dissolved. During the dissolving process, air is bubbled into the mixture so that the mixture becomes saturated. The solids content of the mixture during this process is 5–40% by weight but preferably is 20–30% by weight, and most preferably is 22–25% by weight. In this example the solids content was determined to be 22% by weight. After dissolution of the ore in the sodium hydroxide, the saturated mixture is transferred to a pressure reactor and heated to 170° C. The mixture is then reacted at 170° C. for one hour during which time air is bubbled through the mixture. After reaction, the undissolved solids present in the mixture are removed by filtration, settling and/or centrifugation. Upon completion of the process, a liquid product is formed which is a minimum of sixteen percent oxidized humic acid in aqueous solution. The pH of said product is 8.5 and the precipitation pH (i.e. the pH at which the material become insoluble and forms a precipitate) is 4.2.

It is apparent from the above example that the process of this invention is a simple and relatively inexpensive process for producing oxidized humic acid concentrates. A further advantage of the process is that the conditions can be varied so as to control the extent of oxidation. Table 1 shows how sodium hydroxide, temperature and/or oxygen concentration can be varied to produce humic acid concentrates with varying degrees of oxidation, and hence, precipitation pH.

EXAMPLE 2

One of the envisioned usages of the oxidized humic acids produced by the process described herein is as viscosity reducers. Table 2 shows that compared to simple alkaline extracted humic acids, the oxidized humic acids produced by the process described herein are superior dispersants for systems such as kaolin clay. While dispersion of kaolin clay is given as an example, one skilled in the art would also envision the use of such products in other inorganic and organic systems such as ceramics and agricultural chemicals.

It is further expected that, like other humic acid extracts, the humic acid concentrates formed by the process described herein are beneficial to plant growth. When added to soil in even small amounts, such products are known to stimulate plant growth, enhance color and seed germination. Because of their lower precipitation pH, it is further expected that the humic acid concentrates formed by the process described herein will have improved compatibility in liquid fertilizer solutions. They may also be used in combination with dry fertilizers, to soak and/or spray on seed prior to planting, and for making soil and/or foliar applied micronutrients.

While this disclosure details the preferred embodiment of the present invention, other embodiments of the invention may be devised without departing from the basic intent of this disclosure, the full scope of which is determined by the following claims.

TABLE 1

EFFECT OF OXYGEN PRESSURE AND ALKALI CONCENTRATION ON YIELD AND PRECIPITATION pH OF OXIDIZED HUMIC ACIDS

| Oxygen Charge (psi) | Alkali Charge (%) | Temperature °C. | Yield, % | Precipitation pH |
|---|---|---|---|---|
| 10 | 15 | 170 | 73 | 4.2 |
| 10 | 30 | 170 | 71 | 3.7 |
| 200 | 15 | 170 | 75 | 4.9 |
| 200 | 30 | 170 | 70 | 3.2 |
| 10 | 22.5 | 140 | 77 | 3.9 |
| 100 | 22.5 | 140 | 75 | 3.3 |
| 100 | 30 | 140 | 72 | 2.9 |

TABLE 2

DISPERSION DATA - 40% KAOLIN CLAY SLURRY

| Oxygen Charge, psi | Alkali Charge, % | Temperature, °C. | Viscosity, cps |
|---|---|---|---|
| 0 | 30 | 30 | 59 |
| 10 | 30 | 170 | 24 |
| 200 | 30 | 170 | 13 |

I claim:

1. A method of producing oxidized humic acid concentrates, comprising the steps of:
   (a) dissolving a humic acid containing ore in alkali to form a reaction mixture;
   (b) reacting said reaction mixture with an oxidant under conditions of temperature and pressure and for a time sufficient to cause the oxidation of the humic acid containing ore to produce an oxidized humic acid concentrate; and (c) separating the oxidized humic acid concentrate from the reaction mixture.

2. The method of claim 1 wherein said humic acid containing ore is selected from lignites, brown coals, peats, and mixtures thereof.

3. The method of claim 1 wherein said humic acid containing ore is leonardite.

4. The method of claim 1 wherein said alkali is selected from sodium hydroxide, potassium hydroxide, ammonium hydroxide, lithium hydroxide, sodium carbonate, potassium carbonate, lithium carbonate, and mixtures thereof.

5. The method of claim 1 wherein the alkali is sodium hydroxide and comprises 10–30% by weight of said reaction mixture.

6. The method of claim 1 wherein the alkali is potassium hydroxide and comprises 14–42% by weight of said reaction mixture.

7. The method of claim 1 wherein the alkali is ammonium hydroxide and comprises 9–26% by weight of said reaction mixture.

8. The method of claim 1 wherein said oxidant is selected from oxygen, air and mixtures thereof.

9. The method of claim 8 wherein the oxidant during reaction is bubbled through the reaction mixture at a charge of 5–200 psi.

10. The method of claim 1 wherein the reaction mixture is reacted for 0.5–6 hours.

11. The method of claim 1 wherein the step of reacting the reaction mixture takes place at a temperature of from 100° C.–200° C.

12. The method of claim 1 further including the step of forming the oxidized humic acid concentrate into a powder form.

13. The method of claim 1 further including the step of saturating the reaction mixture with oxygen prior to reacting said reaction mixture.

14. A method for producing oxidized humic acid concentrates, comprising the steps of:

(a) dissolving a humic acid containing ore in alkali at a concentration of 5–40% solids to form a reaction mixture;

(b) reacting said mixture at 100° C.–200° C. with oxygen for at least 0.5 hour; and (c) separating the resulting oxidized humic acid concentrates from the reaction mixture.

15. The method of claim 14 wherein the alkali is sodium hydroxide and comprises 10–30% by weight of said reaction mixture.

16. The method of claim 14 wherein the alkali is potassium hydroxide and comprises 14–42% by weight of said reaction mixture.

17. The method of claim 14 wherein the alkali is ammonium hydroxide and comprises 9–26% by weight of said reaction mixture.

18. The method of claim 14 wherein the oxygen used in the step of reacting is bubbled through the reaction mixture at a charge of 10–200 psi.

19. The method of claim 14 wherein the reaction mixture is reacted for 1–4 hours.

20. The method of claim 14 further including the step of saturating the reaction mixture with oxygen prior to reacting said reaction mixture.

* * * * *